United States Patent
Koski et al.

(10) Patent No.: US 11,662,757 B2
(45) Date of Patent: May 30, 2023

(54) METHODS AND APPARATUSES FOR EXTENDED CURRENT LIMIT FOR POWER REGULATION

(71) Applicant: QUALCOMM Incorporated, San Diego, CA (US)

(72) Inventors: Marko Koski, Chandler, AZ (US); Edgar Marti-Arbona, Chandler, AZ (US); Gordon Lee, Gilbert, AZ (US); Anish Muttreja, Denver, CO (US); Ravi Jenkal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/207,478

(22) Filed: Mar. 19, 2021

(65) Prior Publication Data

US 2021/0294369 A1 Sep. 23, 2021

Related U.S. Application Data

(60) Provisional application No. 62/992,730, filed on Mar. 20, 2020.

(51) Int. Cl.
*G05F 1/573* (2006.01)
*G05F 1/56* (2006.01)
*H02M 1/00* (2006.01)

(52) U.S. Cl.
CPC .......... *G05F 1/5735* (2013.01); *G05F 1/562* (2013.01); *H02M 1/0009* (2021.05); *H02M 1/0025* (2021.05)

(58) Field of Classification Search
CPC ........ G05F 1/5735; G05F 1/562; G05F 1/573; H02M 1/0009; H02M 1/0025; H02M 1/32; H02M 3/158
See application file for complete search history.

(56) References Cited

U.S. PATENT DOCUMENTS

2015/0268678 A1\* 9/2015 Yu .............................. G05F 1/46
327/540

\* cited by examiner

*Primary Examiner* — Jung Kim

(57) ABSTRACT

A method and apparatuses for power regulation using an extended current limit are disclosed. The power regulator detects an occurrence of an output current of the regulator exceeding a first current limit, triggers an extended current limit timer based on the detected occurrence, regulates the output current according to a second current limit higher than the first current limit based on a duration of the extended current limit timer, and regulates the output current according to the first current limit based on an expiration of the duration of the extended current limit timer.

9 Claims, 7 Drawing Sheets

METHODS AND APPARATUSES FOR EXTENDED CURRENT LIMIT FOR POWER REGULATION

CLAIM OF PRIORITY UNDER 35 U.S.C. § 119

The present application for patent claims priority to U.S. Provisional Application No. 62/992,730 entitled "METHODS AND APPARATUSES FOR EXTENDED CURRENT LIMIT FOR POWER REGULATION" filed Mar. 20, 2020, and assigned to the assignee hereof and hereby expressly incorporated by reference herein.

TECHNICAL FIELD

Certain aspects of the present disclosure generally relate to electronic circuits and, more particularly, to a circuit for a power regulator with an extended current limit.

BACKGROUND

Power management integrated circuits (power management ICs or PMICs) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as DC to DC conversion, battery charging, power-source selection, voltage scaling, power sequencing, etc.

SUMMARY

Certain aspects of the present disclosure generally relate to a switching regulator circuit. The switching regulator includes a first transistor having a first terminal coupled to an input voltage and a second terminal coupled to an output of the regulator, a second transistor having a first terminal coupled to the second terminal of the first transistor and a second terminal coupled to a reference potential, and control logic having a first output coupled to a gate of the first transistor and a second output coupled to a gate of the second transistor. The control logic may detect an occurrence of an output current of the regulator exceeding a first current limit, trigger an extended current limit timer based on the detected occurrence, regulate the output current according to a second current limit higher than the first current limit based on a duration of the extended current limit timer, and regulate the output current according to the first current limit based on an expiration of the duration of the extended current limit timer.

Certain aspects of the present disclosure provide for a method of regulation using an extended current limit. The method includes detecting an occurrence of an output current of a regulator exceeding a first output current threshold, triggering a duration of an extended current limit window based on the detected occurrence, the extended current limit window limiting the output current of the regulator to a second output current threshold higher than the first output current threshold, and triggering a duration of a cooldown timer limiting the output current of the regulator to the first output current threshold based on an expiration of the duration of the extended current limit.

Certain aspects of the present disclosure provide for a switching regulator architecture. The switching regulator architecture includes an output inductor and a switching regulator. The switching regulator includes current monitoring circuitry configured to measure an output current of the output inductor, control logic. The control logic may detect an occurrence of the measured output current exceeding a first output current threshold, trigger a duration of an extended current limit window based on the detected occurrence, the extended current limit window to limit the output current to a second output current threshold higher than the first output current threshold, and trigger a duration of a cooldown timer to limit the output current to the first output current threshold based on an expiration of the duration of the extended current limit.

Certain aspects of the present disclosure provide for a device having a regulator configured to operate according to an extended current limit. The device includes a memory and at least one processor coupled to the memory. The device may operate a first component according to a boosted performance mode during a first duration using an output current from at least one power supply rail coupled to an output of the regulator, detect an occurrence of the output current of the regulator exceeding a first output current limit, and implement one or more remedial operations on the first component during a second duration in response to the detection, the one or more remedial operations configured to reduce an amount of output current being provided by the regulator to the first component according to a second output current limit higher than the first output current limit.

Certain aspects of the present disclosure provide for a voltage regulator. The voltage regulator includes means for detecting an occurrence of an output current of a regulator exceeding a first output current threshold, means triggering a duration of an extended current limit window based on the detected occurrence, the extended current limit window limiting the output current of the voltage regulator to a second output current threshold higher than the first output current threshold, and means triggering a duration of a cooldown timer limiting the output current of the voltage regulator to the first output current threshold based on an expiration of the duration of the extended current limit.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Wireless System

Figure 1:
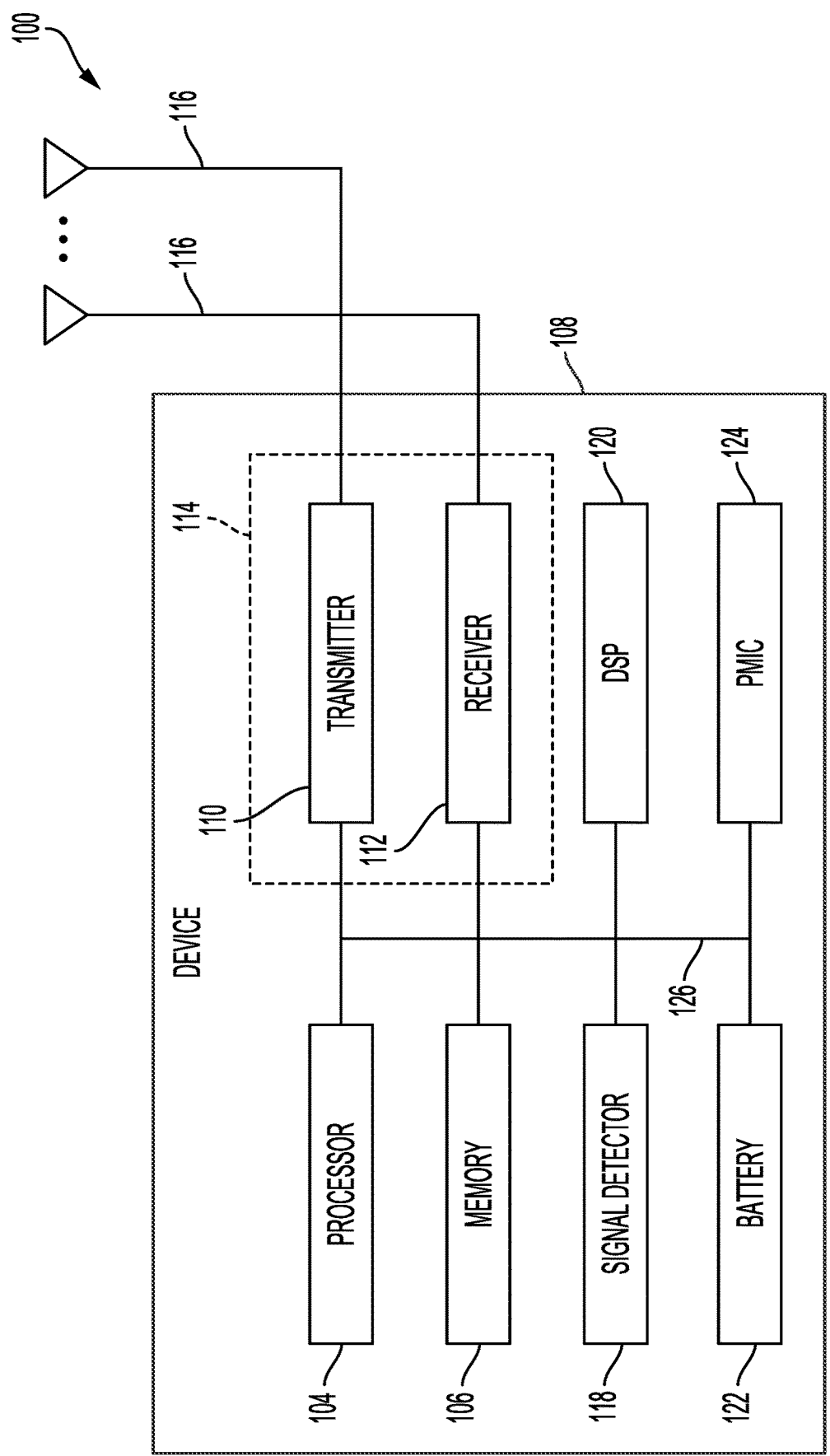
FIG. 1 illustrates a block diagram of an example device including a power regulator implementing an extended current limit, in accordance with certain aspects of the present disclosure.

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 which controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of transmit antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signal characteristics as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC to DC conversion, battery charging, power-source selection, voltage scaling, power sequencing, etc. In certain aspects, the PMIC 124 includes one or more regulators (e.g., a liner regulator, a switching regulator, etc.) configured to operate with an extended current limit as described herein and may be used for voltage and/or current regulation. The various systems and circuit elements of the device 100 may communicate with each other uni-directionally and/or bi-directionally via one or more serial or parallel communication buses 126.

Example Regulator Architecture

Certain aspects of this present disclosure generally relate to power regulators configured to operate with an extended output current limit that is higher than a nominal output current limit. In the context of the present disclosure, a power regulator is a circuit configured to provide a controlled (i.e., regulated) output comprising one or more of an output voltage, output current, or output power. By implementing an extended output current limit, the power regulator may temporarily supply current for load pulses that otherwise would exceed the nominal output current limit. Using a power regulator with an extended current limit, as described herein, may provide several advantages, including reducing component sizes, such an output inductor of a regulator, required to meet a current limit associated with the extended output current limit. For example, a power regulator may be designed based on current rating requirements set by load pulses to be supplied by the regulator. The load pulses may include load pulses with relatively short load pulse widths at relatively low duty cycles Such load pulses may have a larger current requirement than load pulses with longer load pulse widths to be supported by the power regulator and may occur at periodic intervals. Accordingly, the power regulator may be designed to continually meet the current limit rating of the shorter, higher current, load pulses even though the regulator may be supplying current for the longer, lower current, load pules for much of the operation time of the power regulator. By allowing a power regulator to operate using an extended current limit higher than a nominal current limit for limited momentary periods of time, the current rating for power regulator components may be lower as compared to a current rating based on continual load pulses according to the highest current requirement.

Figure 2:
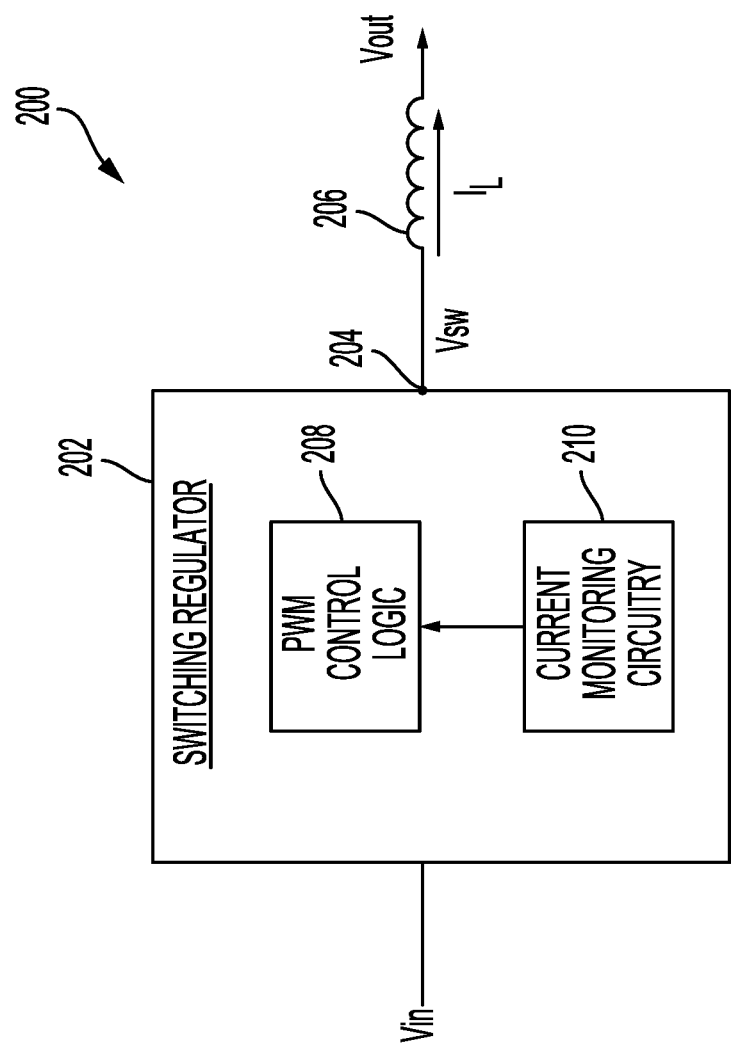
FIG. 2 illustrates a block diagram of a switching regulator architecture supporting an extended current limit, in accordance with certain aspects of the present disclosure.

The concepts presented herein could be applied to virtually any of the multitude of regulator architectures and even other types of power delivery circuits. For brevity's sake and by way of example, a step-down buck SMPS is used for descriptive purposes herein to convey various attributes of the present disclosure. That should not be construed as a limitation of the application space of the present disclosure which could similarly be extended to various other power delivery systems such as step-up SMPSs, linear regulators, power amplifiers, current-limited power switches, etc. As a general application example, FIG. 2 illustrates a block diagram of a step-down switching regulator architecture 200 supporting an extended current limit, in accordance with certain aspects of the present disclosure. The switching regulator architecture 200 includes power regulator comprising a switching regulator 202 with a switching output node 204 coupled to an output inductor 206. In one embodiment, the switching regulator architecture 200 includes control logic 208 and current monitoring circuitry 210. The control logic 208 is configured to control operation of switches (not shown) of the switching regulator 202 in order to regulate one or more operational parameters of the switching regulator 202. For example, the control logic 208 may control the switches based on monitoring one or more operational parameters such as input current into the switching regulator 202, current through the output inductor 206, and/or the output voltage (Vout) of the switching regulator 202. In the following embodiment examples, output current is described as a metric that is monitored and controlled, but it should be understood that other metrics representing output power are anticipated and could be substituted in similar fashion to manage system power dissipation and/or thermal robustness.

In one embodiment, the current monitoring circuitry 210 is configured to monitor at least the output current ($I_L$) flowing through the output inductor 206 and provide information associated with the monitored output current $I_L$ to the control logic 208. For example, in one implementation the current monitoring circuitry 210 may determine the output current $I_L$ by measuring current through one or more switches of the switching regulator 202. In another implementation, the current monitoring circuitry 210 may determine a voltage drop across the output inductor 206 in order to calculate the output current $I_L$ of the output inductor 206. The information provided by the current monitoring circuitry 210 to the control logic 208 may be in the form of an analog current, an analog voltage representative of the output current, or a digital value corresponding to a value of the monitored output current $I_L$. The provided information may be used by the control logic 208 to implement an extended output current limit (ECL) mode.

In an exemplary embodiment, the ECL mode allows the switching regulator 202 to exceed a nominal output current limit (CL), which limits the output current $I_L$ to a first threshold value, for a duration of time to operate with an extended current limit, which limits the output current $I_L$ to a second threshold value that is higher than the first threshold limit. After the duration of time has expired, the current limit is returned to the CL for a cooldown duration. The control logic 208 monitors the output current $I_L$ using the information provided by the current monitoring circuitry 210 to detect if the output current $I_L$ exceeds the CL. An output current excursion exceeding CL will trigger an ECL window timer which permits the switching regulator 202 to operate output current $I_L$ up to the higher ECL current limit for a period of time defined by the ECL window timer. After the ECL window timer expires, the control logic 208 is configured to limit the output current $I_L$ to the nominal CL and trigger a cool down timer defining the cool down duration which prevents the switching regulator from exceeding the nominal CL until the cooldown timer has expired. The timers (i.e., ECL window timer, cooldown timer) and the current limits (i.e., nominal CL, and ECL) may be set at fixed values or be adjustable. In one implementation, the timers may be fixed values based on parameters such as periodicity of expected load attacks which require higher output current and the operational requirements of one or more components of the switching regulator architecture 200. For example, the switching regulator architecture 200 may set the timers and current limits to allow for a smaller inductor to be used in the switching regulator architecture 200 to operate at a higher output current for limited amounts of time while still meeting thermal requirements. By allowing the use of smaller inductors, instead of using larger inductors required for supporting continuous operation at the higher current limit, component costs can be reduced as well as resulting in area savings due to the reduced component size.

In another implementation, one or more of the timers may be adjusted based on the amount of output current $I_L$ monitored during a timer duration. This scheme allows for dynamic adjustment of timers based on cumulative power dissipation or delivery to aid in further optimizing system performance and thermal robustness. In one such implementation, the amount of current monitored during the ECL window timer duration may be used to adjust the duration of cooldown timer. For example, if the monitored current indicates that output current during the ECL window timer occurred at a certain percentage under/over the nominal CL, the cooldown timer may be reduced/increased in duration, respectively, as compared to a fixed timer. As another example, if the monitored output current is within a particular margin (e.g., 5%) of the nominal CL during a current cooldown timer duration, the cooldown timer may be triggered again at the expiration of the duration of the current cooldown timer. This retriggering of the cooldown timer may ensure that the switching regulator 202 has sufficiently recovered from the previous ECL in order to, for example, meet thermal requirements of an output inductor and/or power stage. As another example, if the monitored amount of output current $I_L$ during a timer exceeds a first threshold defined by an amount of current, a future ECL window timer duration may be reduced in duration and/or a future cooldown timer may be increased in duration. Likewise, if the monitored amount of output current $I_L$ during a timer does not exceed a second threshold defined by an amount of current, a future ECL window timer duration may be increased in duration and/or a future cooldown timer may be reduced in duration. Furthermore, the amount of the increase or decrease in the timer duration may be based on a difference between the monitored amount of current and the first and/or second threshold values. By allowing one or more of timers to be adjusted based on the amount of current monitored during a timer duration (e.g. an ECL window timer), flexibility in responding to output current can be improved while still operating within thermal requirements, such as that required by the output inductor 206.

In another embodiment, one or more of the output current limit thresholds (i.e., CL and ECL) may be adjusted based on the amount of output current $I_L$ monitored during a timer duration. In one implementation, if the monitored amount of output current $I_L$ exceeds and/or is below a defined threshold during a timer duration, the output current limit threshold may be increased or decreased as compared to a current threshold. For example, if the monitored amount of output current $I_L$ exceeds a percentage of time operating above the nominal CL during an ECL window timer duration, the nominal CL and/or ECL may be reduced for a future period. Likewise, if the monitored amount of output current $I_L$ is below the percentage of time operating above the nominal CL during an ECL window timer duration, the nominal CL and/or ECL may be increased for a future period. In other implementations, the output current limit thresholds can be adjusted based on various other metrics, such as the amount of monitored current during a timer duration, the amount of monitored current operating within a margin of an output current limit threshold. An exemplary benefit of allowing adjustable output current limit thresholds is that the switching regulator architecture 200 may be able to compensate for varying output current load demands (e.g., higher current with a shorter load attack duration, lower current with a longer load attack duration, etc.) while maintaining operation within thermal requirements while being able to be implemented using smaller components.

It should be noted that various combinations of fixed and adjustable timer and output current limits may be implemented. For example, a switching regulator architecture may operate with fixed timer durations while adjusting one or more output current limits and vice versa.

Figure 3:
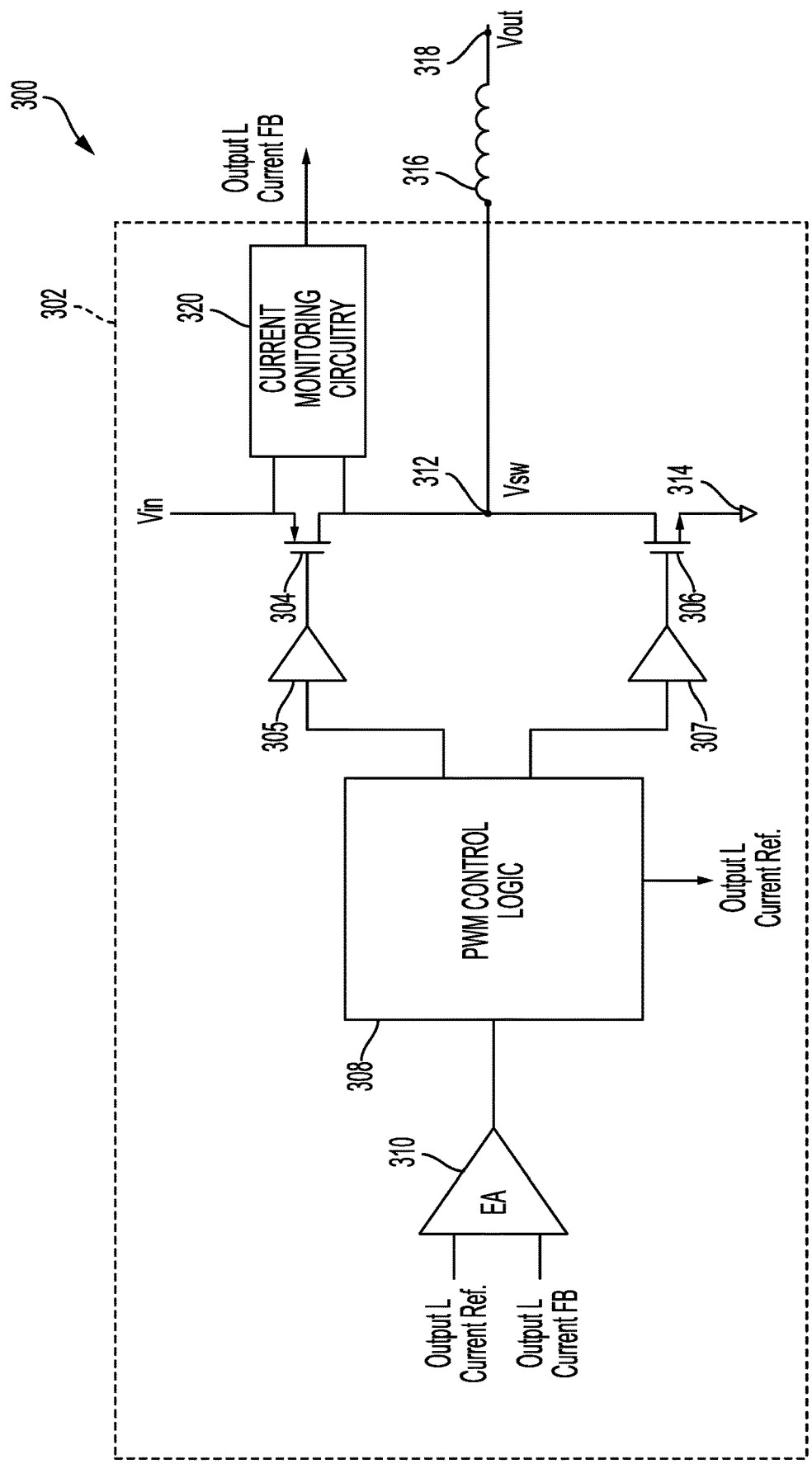
FIG. 3 illustrates an example implementation of a switching regulator architecture of FIG. 2 supporting an extended current limit, in accordance with certain aspects of the present disclosure.

FIG. 3 illustrates an example switching regulator architecture 300 of FIG. 2 supporting an extended output current limit, in accordance with certain aspects of the present disclosure. The example switching regulator architecture 300 is configured accordingly to a buck switching regulator 302 topology. However, it should be appreciated that the regulator may be implemented according to various other switching regulator topologies (e.g., boost and buck-boost topologies). In one implementation, the buck switching regulator 302 includes a first transistor 304, a second transistor 306, control logic 308, and at least one error amplifier 310. The first transistor 304 has a first terminal coupled to an input voltage Vin, a second terminal coupled to a first terminal of the second transistor 306 and a switching voltage node $V_{SW}$ 312, where the second transistor 306 further has a second terminal coupled to a reference potential 314 (e.g., ground). In the exemplary implementation, the first transistor 304 comprises a P-type metal-oxide-semiconductor (PMOS) transistor while the second transistor 306 comprises an N-type metal-oxide-semiconductor (NMOS) transistor. However, the first and second transistors 304, 306 may be implemented using various transistor topologies, such as both being NMOS transistors or PMOS transistors, or a different combination thereof. The switching regulator architecture 300 further includes an output inductor 316 coupled to the switching voltage node $V_{SW}$ 312 and an output voltage node (Vout) 318.

The control logic 308 has a first output coupled to an input terminal of a first driver amplifier 305 and a second output coupled to a second driver amplifier 307. The output of the first driver amplifier 305 is coupled to a gate terminal of the first transistor 304 and the output of the second driver amplifier 307 is coupled to a gate terminal of the second transistor 306. The first and second driver amplifiers 305, 307 are configured to generate a drive control signal based on a respective control signal received from the control logic 308 at the inputs of the first and second driver amplifiers 305, 307. For example, the first and second driver amplifiers may amplify the voltage level of control signal from the control logic 308 to a voltage level sufficient to drive the first and second transistors 304, 306. However, in another implementation, the control signal from the control logic 308 may have a sufficiently high voltage level to drive the first and second transistors 304, 306 thereby allowing omission of the first and second driver amplifiers 305, 307.

The switching regulator architecture 300 includes current monitoring circuitry 320 having a first input coupled to a source terminal of the first transistor 304 and a second input coupled to a drain terminal of the first transistor 304. The current monitoring circuitry 320 is configured to output a feedback signal (Output L Current FB) indicative of current flowing through the output inductor 316. For example, the current monitoring circuitry can be configured to measure a voltage drop across the first transistor to be output as the feedback signal which can be used to determine an amount of current flowing through the first transistor 304 which is representative of the current flowing through the output inductor 316. As another example, the current monitoring circuitry 320 is configured generate a current proportional to current flowing through the first transistor 304 to be output as the feedback signal. In one implementation, the current monitoring circuitry 320 is configured accordingly to a current mirror topology to generate the proportional current.

The error amplifier (EA) 310 is configured to receive the feedback signal (Output L Current FB) from the current monitoring circuitry 320 at a first input. The EA further is further configured to receive a reference signal (Output L Current Ref.). The reference signal may be set by the control logic 308 either directly from the control logic 308 or indirectly via circuitry (not shown) configured to generate the reference signal based on a signal provided by the control logic 308. The reference signal is configured to set an output inductor current limit for the buck switching regulator 302. The EA 310 outputs an error signal comprising a difference between the reference signal and the feedback signal amplified at a desired gain value, which is provided to an input of the PWM control logic 308. The control logic 308 is configured to alternately operate the first and second transistors 304, 306 between "on" and "off" states, such as via a pulse width modulation scheme, based on the provided error signal to control the output inductor current within the current limit set by the reference signal. In the present disclosure, an alternate switching of "on" and "off" states between the first and second transistors may be referred to as a "switching frame".

In support of operating the switching regulator architecture 300 according to an extended output current limit, the control logic 308 is configured to determine whether the output inductor current is exceeding a first current limit (e.g., a nominal current limit) based on the received error signal from the EA 310. If the buck switching regulator 302 is permitted to operate at an extended current limit, the control logic 308 is configured to allow the output current limit to exceed the first current limit by setting a second higher current limit (e.g., an extended current) for a duration of time by adjusting the reference signal to the second current limit. Upon determining that the first current limit has been exceeded, the control logic 308 is further configured to trigger an extended current limit duration timer (e.g., ECL window timer) configured to set the duration of time that the buck switching regulator 302 operates according to the second current limit. After the extended current limit duration timer has expired, for example if the timer counts down to zero from a set value or counts to a set value from zero, the control logic 308 is configured to set the reference signal back to the first current limit from the second current limit as well as triggering a cooldown timer. The cooldown timer is configured to limit operation of the buck switching regulator 302 to the first current limit until the cooldown timer has expired (i.e., no longer is active).

In one implementation, the switching regulator architecture 300 includes a plurality of EAs 310 (not shown). In such an implementation, the control logic 308 may have single input that selectively receives an output from at least one EA 310 at a time. In another implementation, the control logic 308 may have multiple inputs, each coupled to a respective output of the plurality of EAs 310. The plurality of EAs 310 are each configured to receive a reference value at one input and a corresponding feedback value at a second input and to output a difference value between the reference value and the feedback value to form a corresponding control loop, such limiting the output inductor current. Other examples include control loops for the input current of the buck switching regulator 302 and the target voltage of the battery being charged. In instances where reference and feedback values involve current information, the current information may be converted into voltage information prior to being provided to the inputs of the EA 310. By using different reference and feedback values, the buck switching regulator 302 can be configured to regulate the output of the output voltage node 318 based on voltage and/or current according to the corresponding reference and feedback values.

It should be noted that, in one implementation, the portion of the control logic 308 responsible for supporting one or more aspects of the extended output current limit operation (which may be referred to as "extended current limit circuitry") may be implemented external to the buck switching regulator 302. For example, the extended current limit circuitry and the buck switching regulator 302 may be implemented on separate ICs. In this implementation, the extended current limit circuitry may send and receive one or more signals to/from the buck switching regulator 302 to operate according to the extended current limit as described herein.

Figure 4:
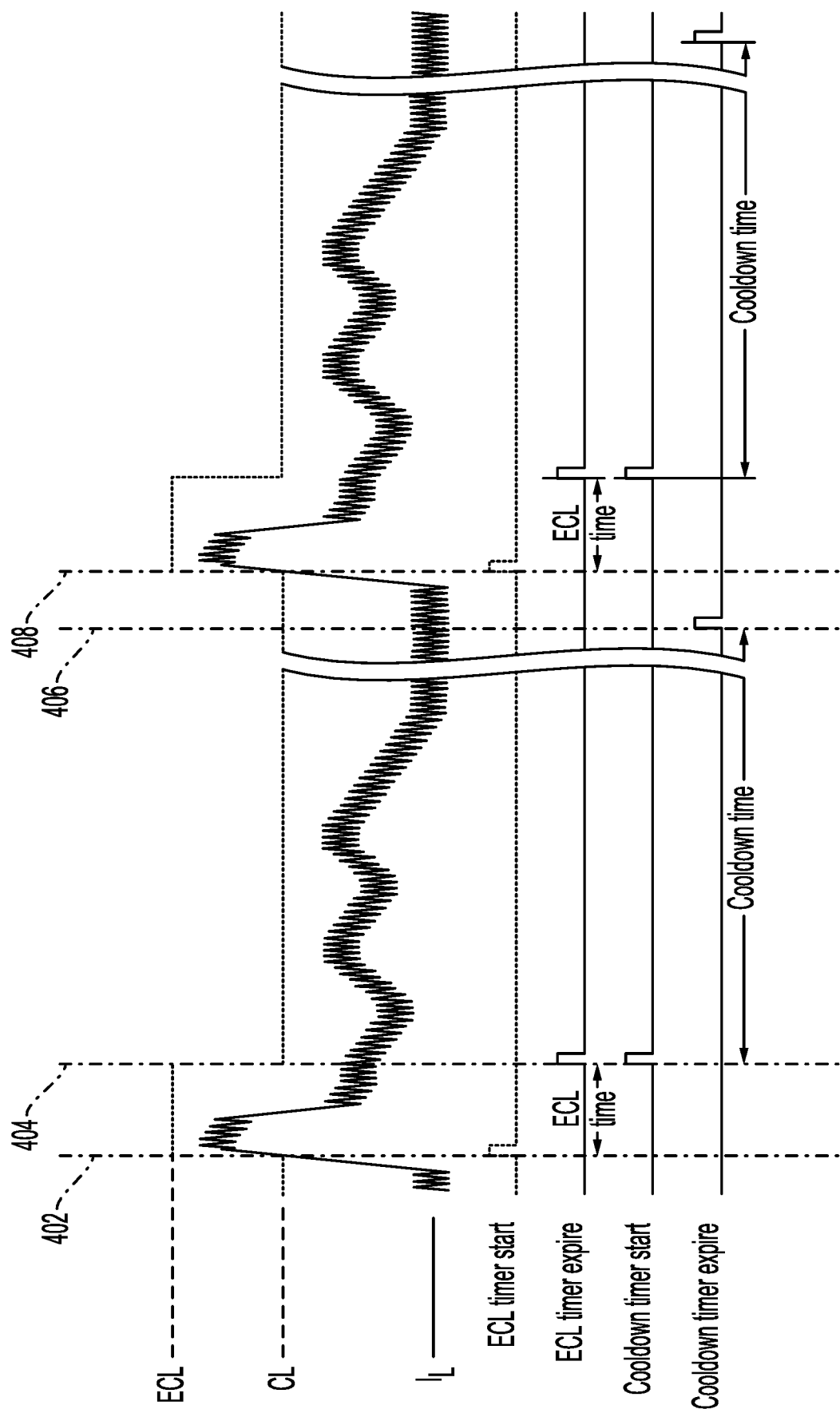
FIG. 4 illustrates an example timing diagram of switching regulator operating according to an extended current limit, in accordance with certain aspects of the present disclosure.

Referring now to FIG. 4, an example timing diagram 400 of switching regulator operating according to an extended current limit is illustrated, in accordance with certain aspects of the present disclosure. The waveform $I_L$ is representative of the monitored output inductor current of the switching regulator. At time 402, the output inductor current exceeds a first current limit (denoted as CL). When the first current limit CL is exceeded, an extended current limit (ECL) timer logic signal for a second current limit, comprising the ECL, is triggered to start the ECL window timer which allows the switching regulator to operate according to the ECL for a period of time defined by the ECL window timer (denoted as ECL time). After expiration of the ECL timer at time 404, and ECL timer expire logic signal (denoted as ECL timer expire) is triggered to reduce the current limit from the second current limit back to the first current limit while triggering a cool down timer using a cool down timer logic signal (denoted as Cooldown timer start). After expiration of the cool down timer after a period of time (denoted as Cooldown time), a cool down timer expire logic signal (denoted as Cooldown timer expire) is sent at time 406 to indicate that the switching regulator is permitted to operate up to the second current as needed, such as at time 408. If/when the first current limit is exceeded, the cycle repeats with a controlled window allowing an extended current limit at the second current limit, followed by a forced cooldown period where the first current limit is enforced.

An exemplary benefit of providing an extended current limit is mitigating a voltage droop at the output of the regulator by allowing an increase in output current during a load attack by a load being supplied power by the regulator. For example, if the regulator was limited to the first current limit during a load attack which was attempting to draw a higher amount of current that allowed by the first current limit, the output voltage level of the regulator would see a droop (i.e., a drop in regulated voltage output) from a target output voltage. By allowing an increased amount of current via the extended current limit, the additional current will be available to be provided during the load attack which may prevent, or at least mitigate, a droop in the voltage output of the regulator thereby improving the output voltage transient response of the regulator. Additionally, increased current capability to supply short duration transient demands can shorten the recovery time and thus improve the overall regulation window seen by system loads.

It should be noted that the generation of the logic signals may occur internally in control logic 308 or may be generated by circuitry (i.e., extended current limit logic circuitry) separate from a portion of the control logic 308 configured to control operation of the first and second switches 304, 306. For example, in one implementation, the extended current limit logic circuitry is configured to generate the logic signals based on information received from the switching regulator (such as via the current monitoring circuit 320 and/or the control logic 308). Furthermore, the generation of the logic signals may be split between internal control logic 308 and the external extended current limit circuitry. For example, the control logic 308 may generate the ECL timer start logic signal to be signaled to the extended current limit circuitry whereas the extended current limit circuitry may generate the ECL timer expire control signal to the control logic 308.

Figure 5:
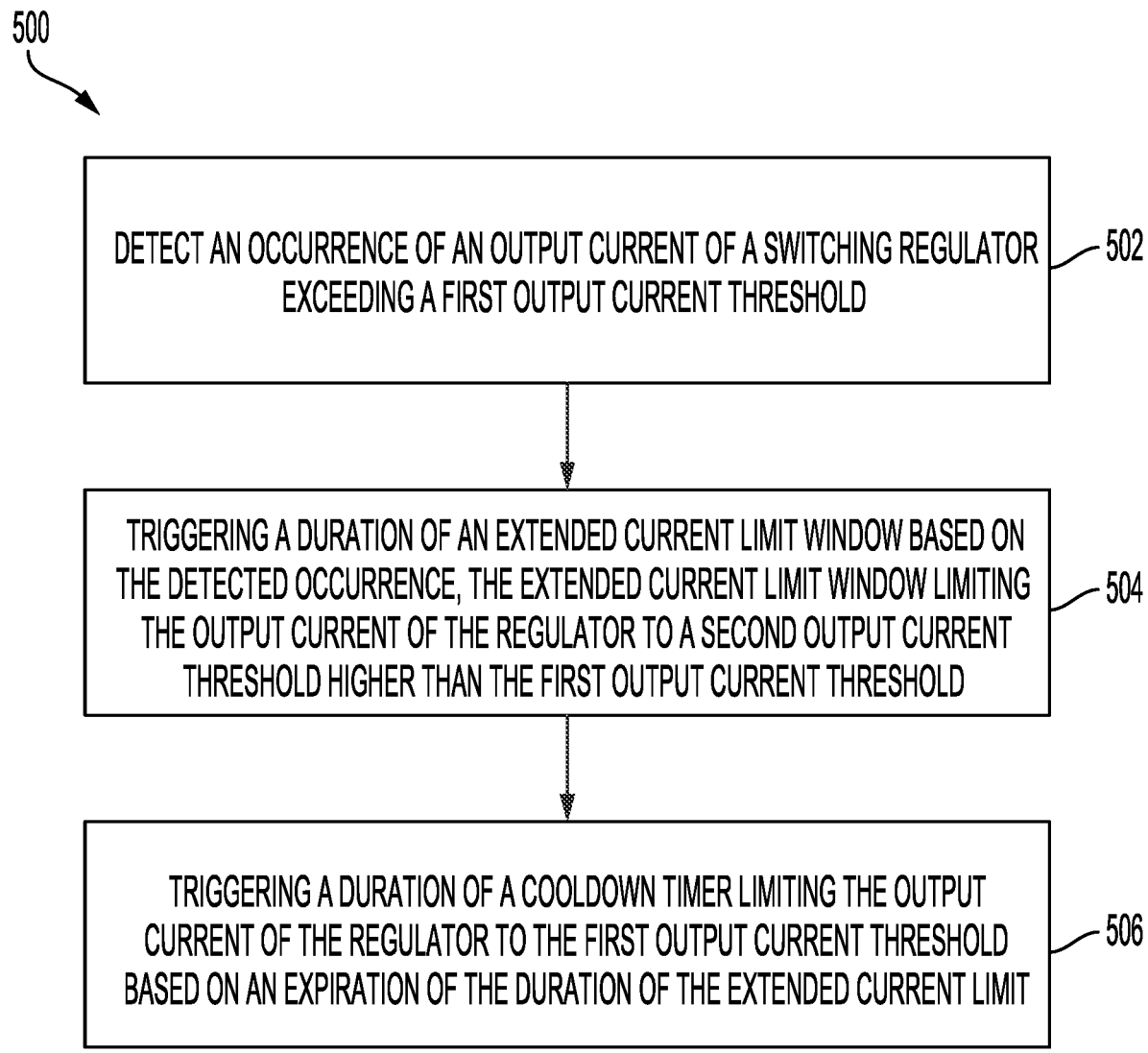
FIG. 5 illustrates an example operation of a switching regulation method using an extended current limit for power regulation, in accordance with certain aspects of the present disclosure.

Referring now to FIG. 5, an example operation of a switching regulation method using an extended current limit for power regulation is illustrated, in accordance with certain aspects of the present disclosure.

At block 502, an occurrence of an output current of a switching regulator exceeding a first output current threshold (i.e., first output current limit) is detected. In one embodiment, the detected output current comprises a detected indication of a current flowing through an output inductor of the switching regulator. In one implementation, the occurrence is detected using current monitoring circuitry configured to measure the indication of current flowing through the output inductor. For example, the detected indication may comprise an indirect indication, such as measuring a voltage drop across a switch of the switching regulator, measuring a current flowing through the switch of the switching regulator, or a direct indication such as measuring the current flowing in and/or out of the output inductor. The detected indication may be recorded in an event log configured to track occurrences of the output current exceeding the first output current threshold. For example, the switching regulator may store the event log in a memory in the control logic or send an indication of the detected occurrence to another circuit, such as a control circuit of a PMIC, for storing of the event log. The event log may be made available to other circuitry of a device containing the switching regulator. An exemplary benefit of making the event log available is that other circuitry may be able to correlate actions performed by the other circuitry that may have caused the first output current threshold to be exceeded. Accordingly, the other circuitry may be able to perform one or more corrective actions to avoid exceeding first output current limit at future times.

At block 504, a duration of an extended current limit window is triggered based on the detected occurrence, where the extended current limit window is configured to limit the output current of the regulator to a second output current threshold (i.e., second output current limit) higher than the first output current threshold. In one embodiment, the triggering is based on setting a current limit flag in response to detecting the occurrence of the output current exceeding the first output current threshold. The current limit flag may be set by circuitry of the switching regulator, such as the control logic, or circuitry external to the switching regulator.

In one implementation, the switching regulator is configured to monitor one or more metrics associated with the output current during the duration of the extended current limit window. Examples of such metrics include the amount of time the output current was within a certain percentage of the second output current threshold, the total measured output current during the extended current limit window, and the amount that the output current limit exceeds the first output current threshold. By monitoring such metrics, the switching regulator may be able to adjust one or more operational parameters associated with the extended current limit such as the duration of the extended current limit window, the current limit associated with the first and/or second output current threshold, and the duration of a cooldown timer as discussed in relation to block 506.

At block 506, a duration of a cooldown timer is triggered limiting the output current of the regulator to the first output current threshold based on an expiration of the duration of the extended current limit. In one embodiment, the cooldown timer duration is configured based on operational requirements of the switching regulator. For example, the output inductor may have a thermal operational limit. By using the cooldown timer, the output inductor may be able to maintain operation of the regulator within the thermal operational limit while still allowing for periods of increased output current as compared to nominal operation. After expiration of the cooldown timer, the regulator may be once again permitted to operate according to the extended current limit window.

Example Current Limit Management System Architecture

A system architecture, such as device 100, using a regulator configured to operate according to an extended current limit can be configured to coordinate with one or more components of the system architecture being supplied power from one or more regulators located in, for example, the PMIC 124 in order to selectively increase the operational performance of the one or more components. For example, one or more components may comprise processor 104 where the processor 104 can be configured to operate at increase voltage and/or clock frequency to boost computational performance of the processor (i.e., boosted performance mode), as compared to nominal operating conditions, while the regulator is operating according to a first output current threshold. When the regulator detects that the output current exceeded the first output current threshold and begins to operate according to the second output current threshold associate with the extended current limit window, the regulator can notify, for example via PMIC 124, the one or more components (e.g., processor 104) of the detection in order for the one or more components to take one or more remedial operations in order to reduce power (e.g., current) being drawn from the regulator. In this example, the notification may be sent via a communications bus 126 of the device 100 from the PMIC 124 to the processor 104 or may be a signal asserted on one or more pins (e.g., an interrupt pin) of the processor 104. In one implementation, the processor 104 may reduce the clock frequency and/or the operational voltage at or below a nominal operating ranges in order to reduce the power required by the processor 104 in order to operate the regulator under the first output current threshold. By reducing the power required by the processor 104, the output current being supplied by the respective regulator may also be reduced thereby assisting the regulator to operate under the first output current threshold.

In some implementations, the first output current threshold may be configured such that output current required for the boosted performance mode will not exceed the first output current threshold during typical operation. Accordingly, in such implementations, the processor may be able to flag any detections of the output current exceeding the first output current threshold as "noteworthy" breaches. By flagging such breaches as "noteworthy", the processor may be able to correlate what combination of operating conditions may have caused the output current to exceed the first output current threshold thereby allowing the processor to implement corrective actions in an effort to avoid future breaches. Such In one embodiment, the one or more components are configured to maintain at least one of the one or more remedial operations during the duration of the cooldown timer of the regulator. The one or more components may be programmed with the duration of the cooldown timer of the regulator or may receive a notification, such as via the communications bus 126, that the cooldown timer of the regulator has expired. Similarly to the cooldown timer, the one or more components may further consider the duration of the extended current limit window of the regulator when maintaining the at least one remedial operation.

In some implementations, the one or more components may be programmed with a latency associated with transmitting the notification from the regulator to the one or more components. For example, the notification from the regulator to the one or more components may take a certain amount of time (e.g., microseconds) to travel over the communications bus. Accordingly, the one or more components may consider this latency of the notification when determining when the cooldown timer of the regulator will expire as the regulator will already be operating in the extended current limit window while the notification is being sent to the one or more components. By considering the latency, the one or more components may more accurately assess when the regulator it permitted to operate again at the second output current threshold and thus be able to operate at increased performance more quickly.

In one implementation, the processor 104 contains one or more processing cores (not shown). The processing cores may be configured for general computational processing or specialized processing, such a graphics processing. A specialized graphic processing core may be referred to as a graphics processing unit (GPU). The processor 104 may include a power management subsystem (not shown) responsible for processing notifications from the regulator and controlling operation of the processing cores, such as implementing the one or more remedial operations, or the one or more processing cores may be their own respective power management subsystem. The power management subsystem may comprise a software subsystem and/or one or more logic circuits.

A regulator, such as a buck switching regulator 302, may provide dedicated power via a dedicated power rail to a processing core or may provide power to a plurality of cores and/or other components of the device 100 via a shared power rail. In the context of the present disclosure, a power rail is meant as a connection to the voltage output node (e.g., voltage output node 318) of a regulator. An exemplary benefit of a regulator with an extended current limit providing a dedicated power rail to a processing core is an improvement in safety of operating the processing core at higher operational performance. For instance, if the higher operational performance causes the regulator to operate in the extended current limit window due to drawing more current than the first output current threshold of the regulator, the processing core can mitigate power needed to be supplied by the rail in response to the notification by the regulator as the processing core is the only component being supplied by the dedicate power rail. In comparison with a shared rail, other components being supplied by the shared rail may comprise a substantial portion of the power being provided by the shared rail. Accordingly, even though the processing core of the shared rail implements one or more remedial operations to mitigate the power required by the processing core, the current needed to be provided over the shared rail by the regulator may still be more than, or at least be in close proximity to, the first or second output current thresholds of the regulator which may risk operational parameters (e.g., thermal) of the regulator to be exceeded. Regardless, such applications where a shared regulator supplies multiple system loads can still be managed by prioritizing remedial operations upon communicating ECL detection to components which are most dominant and/or able reduce consumption via performance reductions in response to ECL-triggered throttling. Alternatively, ECL-triggered throttling can be broadcasted to any or all of the system loads to ensure that total power consumption is reduced to within the capabilities of CL-limited operation of the regulator for the duration of the cooldown timer.

Figure 6:
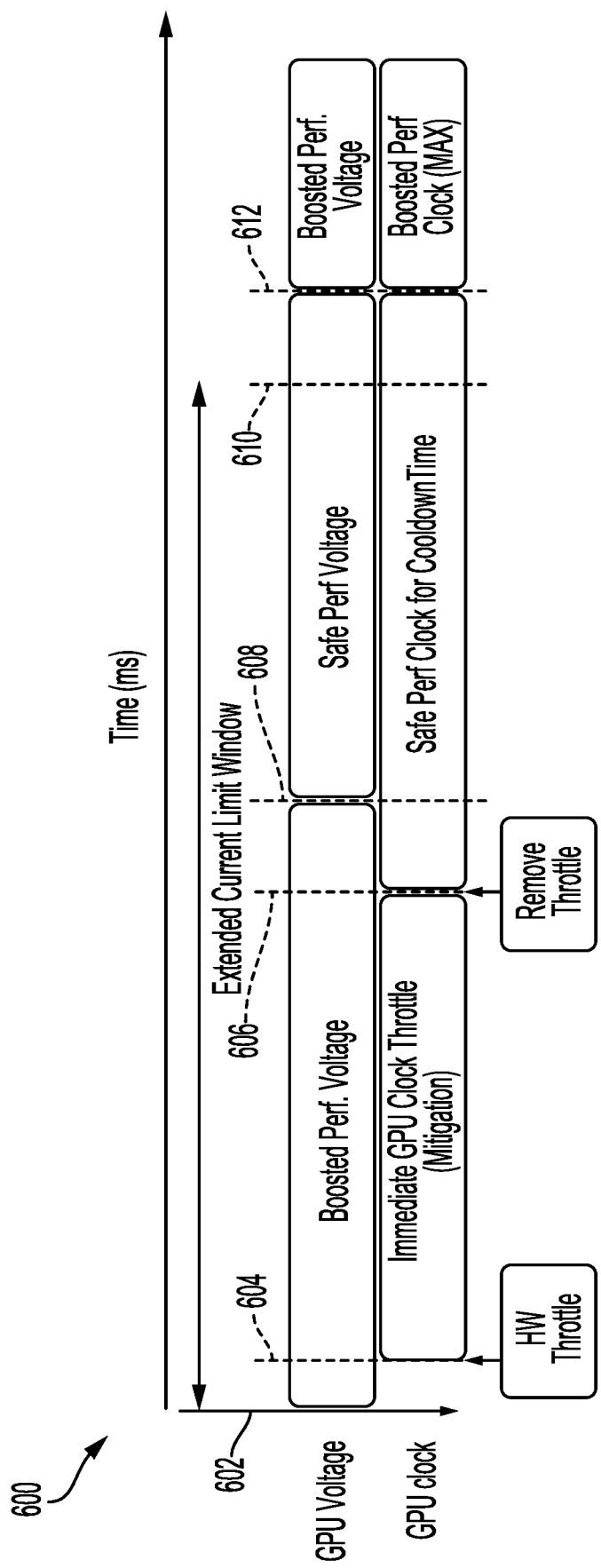
FIG. 6 illustrates an example diagram of a mitigation procedure of a processor in response to an extended current limit notification, in accordance with certain aspects of the present disclosure.

Referring now to FIG. 6, an example diagram of a mitigation procedure of a processor in response to an extended current limit notification is illustrated, in accordance with certain aspects of the present disclosure. In the example of FIG. 6, the processor comprises a GPU, however it should be noted that the mitigation processor is applicable to other processor implementations.

At time 602, a regulator supplying power to the GPU detects an output current of the regulator exceeding a first output current threshold and begins operating under a second output current threshold associated with an extended current limit window. Upon detection of the output current exceeding the first output current threshold, the regulator sends a notification to the GPU that the regulator is operating in an extended current limit window. At time 604, the GPU receives the notification from the regulator and begins to implement a hardware (HW) throttle to reduce the clock frequency of the GPU to a frequency associated with a mitigation mode. Prior to receiving the notification, the GPU was operating in a boosted performance mode, which includes using a boosted clock frequency and performance voltage level, in order to enhance the GPU computational performance over a nominal computational performance. By throttling the GPU to the clock frequency associated with the mitigation mode, the GPU can reduce the current required to be supplied by regulator in order to operate at a desired output current range. For example, the mitigation clock frequency may be selected so that the output current requirement will drop, or be substantially at, the first output current threshold At time 606, the GPU begins to remove the hardware throttle and operates in accordance with a "safe" performance clock frequency. In the context of the present disclosure, "safe" means a performance level designed to consistently require output current from the regulator at or below the first output current threshold. By operating at the safe performance clock frequency, the GPU can comply with the cooldown timer required by the regulator before being able to operate using the extended current limit again. In one implementation, the throttle is fully removed at time 606. In another implementation, the throttle removal process is triggered at time 606, however the throttle is not removed until the GPU transitions to the safe performance voltage as discussed with respect to time 608.

At time 608, the extended current limit window ends, the cooldown timer is triggered, and the GPU begins operating at a "safe" performance voltage level which is a voltage level lower than the boosted performance voltage level for the duration of a cooldown timer. The safe performance voltage level is configured to be able to support operation at the safe performance clock level. In the present example, there is a delay between operating the GPU according to the safe performance clock frequency and the safe performance voltage level (i.e., a safe performance mode). By providing a delay, the GPU may be able to transition to the safe performance clock frequency while still operating at the boosted performance voltage level which may prevent triggering a power fault in the GPU. For example, if the GPU begins to operate at the safe performance level substantially at the same time the GPU is switching from the GPU clock throttle frequency to the safe performance clock frequency, the safe performance voltage level may be insufficient to be able to power the GPU to transition to the safe performance clock frequency thereby triggering the power fault. In response to the power fault, the GPU may cease operation completely or may initiate a reset operation.

At time 610, the duration of the cooldown timer of the extended current limit expires. Upon expiration of the cooldown timer, the regulator providing power to the GPU may once again be allowed to operate according to an extended current limit. In one implementation, the GPU is programmed with the cooldown timer duration of the regulator. In another implementation, the regulator transmits a signal to the GPU, such as over a communications bus 126, that the cooldown timer has expired.

At time 612, the GPU begins to operate according to the boosted performance mode which includes operating at the boosted performance voltage level and the boosted performance clock frequency. In the present example, there is a delay between operating at the boosted performance voltage level and the boosted performance clock frequency in an effort to guarantee a sufficient voltage level is available for operating in accordance with the boosted clock frequency. However, in other implementations there may be substantially no delay. Also in the present example, there is a delay between the expiration of the extended current limit cooldown timer and re-initiating boosted performance. The delay may be a latency associated with signaling to the GPU to operating according to the boosted performance mode or may be configured at a duration to provide a margin of safety before beginning to operate the GPU according to the boosted performance mode in an effort to ensure the regulator has sufficiently recovered from operating according to the higher current limit associated with the extended current window (e.g., meeting a nominal operational thermal requirement). In an implementation in which the regulator transmits a signal to the GPU that extended current limit cooldown timer has expired, the delay may comprise the delay between the regulator transmitting the signal and the GPU receiving the signal. In another implementation, there may be substantially no delay between the time 610 of the expiration of the cooldown timer and time 612 when then GPU begins operating according to the boosted performance mode.

Figure 7:
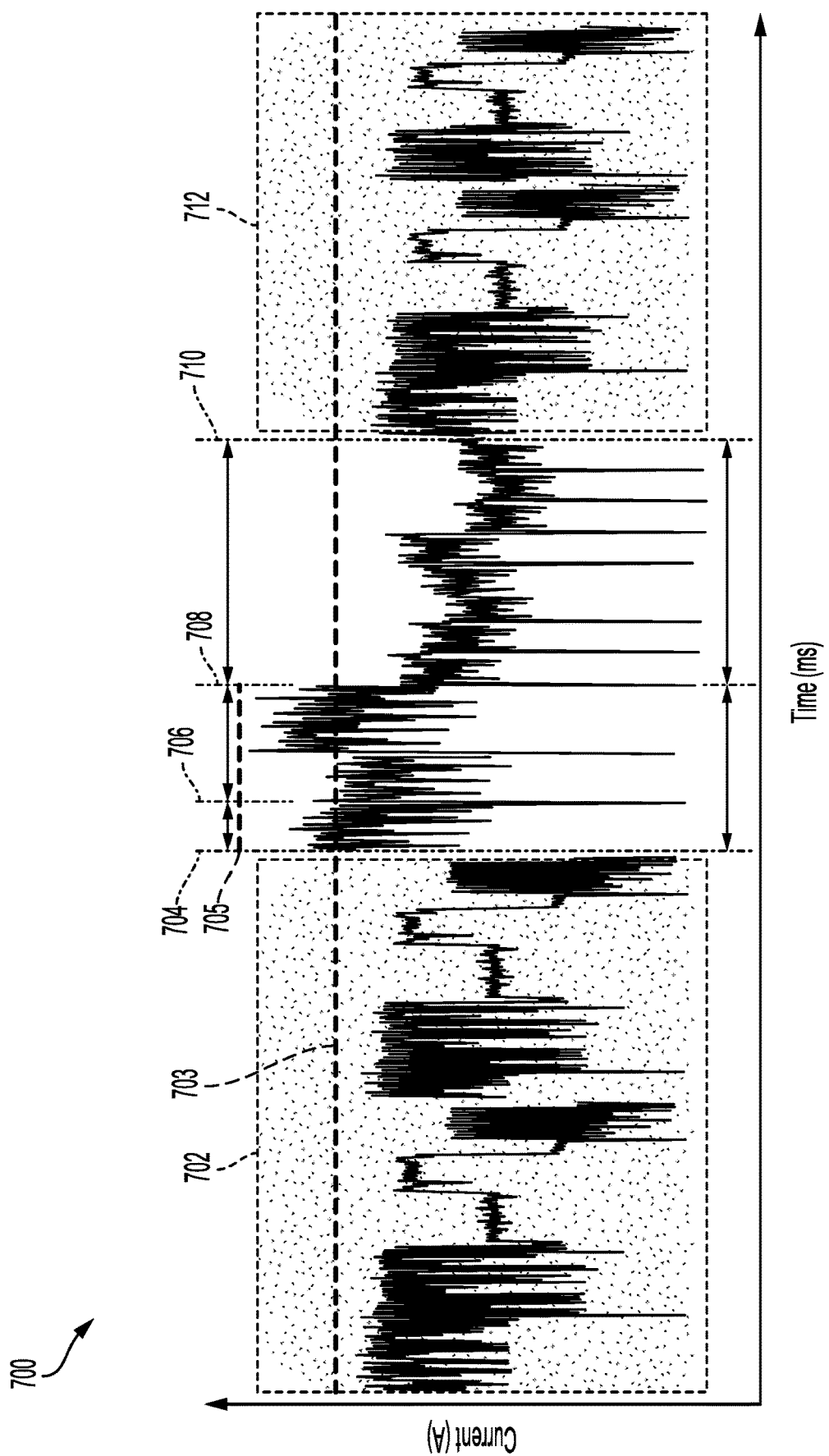
FIG. 7 illustrates an output current waveform of a regulator supplying current to a processor configured to mitigate power consumption in response to an extended current limit notification, in accordance with certain aspects of the present disclosure.

Referring now to FIG. 7, an output current waveform 700 is illustrated of a regulator supplying current to a processor configured to mitigate power consumption in response to an extended current limit notification.

During duration 702, the processor is operating according to a boosted performance mode where the output current of the regulator operates below a first output current threshold 703. At time 704, the output current exceeds the first output current threshold 703. The regulator detects the output current exceeding the first output current threshold and begins to operate according to an extended current limit window defined by a higher second output current threshold 705. The regulator further sends a notification to the processor that the first output current threshold has been exceeded. At time 706, the processor receives the notification from the regulator after some transmission latency. In response to receiving the notification, the processor being to implement one or more remedial operations in an effort to reduce the output current needed from the regulator. For example, the processor may reduce the operational clock frequency and/or operational voltage. The one or more remedial operations are configured to reduce the output current being provided by the regulator to be under the first output current threshold 703 prior to expiration of the extended current limit window. At time 708, the extended current limit window duration expires, and the regulator begins providing output current to the processor according to the first output current threshold 703. As can be seen by the output current waveform, the processor maintains at least one of the remedial operations so that the output current remains under the first output current threshold for at least the duration of the extended current limit window cooldown timer. At time 710, the extended current limit cooldown timer expires, and the processor begins to operate again according to the boosted performance mode during duration 712.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. For example, means for detecting an occurrence of an output current of a regulator exceeding a first output current threshold may comprise, for example, the current monitoring circuit 210. Means triggering a duration of an extended current limit window based on the detected occurrence may comprise, for example, at least of portion of the control logic 208. Means triggering a duration of a cooldown timer limiting the output current of the voltage regulator to the first output current threshold based on an expiration of the duration of the extended current limit may comprise, for example, at least a portion of the control logic 208.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with discrete gate or transistor logic, discrete hardware components, or any combination thereof designed to perform the functions described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A device having a regulator configured to operate according to an extended current limit, the device comprising:
   a memory;
   at least one processor coupled to the memory and configured to cause the device to:
      operate a first component according to a boosted performance mode during a first duration using an output current from at least one power supply rail coupled to an output of the regulator;
      detect an occurrence of the output current of the regulator exceeding a first output current limit; and
      implement one or more remedial operations on the first component during a second duration in response to the detection, the one or more remedial operations configured to limit an amount of output current being provided by the regulator to the first component according to a second output current limit higher than the first output current limit.

2. The device of claim 1, wherein the one or more remedial operations comprises a reduction in at least an operating clock frequency of the first component from an operating clock frequency associated with the boosted performance mode.

3. The device of claim 1, wherein the at least one processor is further configured to operate according to a safe performance mode during a third duration subsequent to the second duration using an amount of output current being provided by the regulator to the first component according to the first output current limit.

4. The device of claim 3, wherein the regulator is configured to provide an amount of output current to the first component according to the first output current limit during the third duration.

5. The device of claim 3, wherein the safe performance mode is defined by one or more operational parameters of the first component being configured to require an amount of output current from the regulator below the first output current limit.

6. The device of claim 1, wherein the first component comprises at least one processing core of the at least one processor.

7. The device of claim 1, wherein the at least one power rail is dedicated to supplying power only to the first component.

8. The device of claim 1, wherein the at least one processor is further configured to operate according to the boosted performance mode after an expiration of the second duration.

9. The device of claim 8, wherein the expiration of the second duration is based on a cooldown timer of the regulator configured to prevent the regulator from providing an amount of output current higher than the first output current limit while the cooldown timer is active.

\* \* \* \* \*